No. 882,190. PATENTED MAR. 17, 1908.
J. T. FAGAN.
MACHINE FOR HEATING GLASS TUBES.
APPLICATION FILED APR. 20, 1906.
2 SHEETS—SHEET 1.
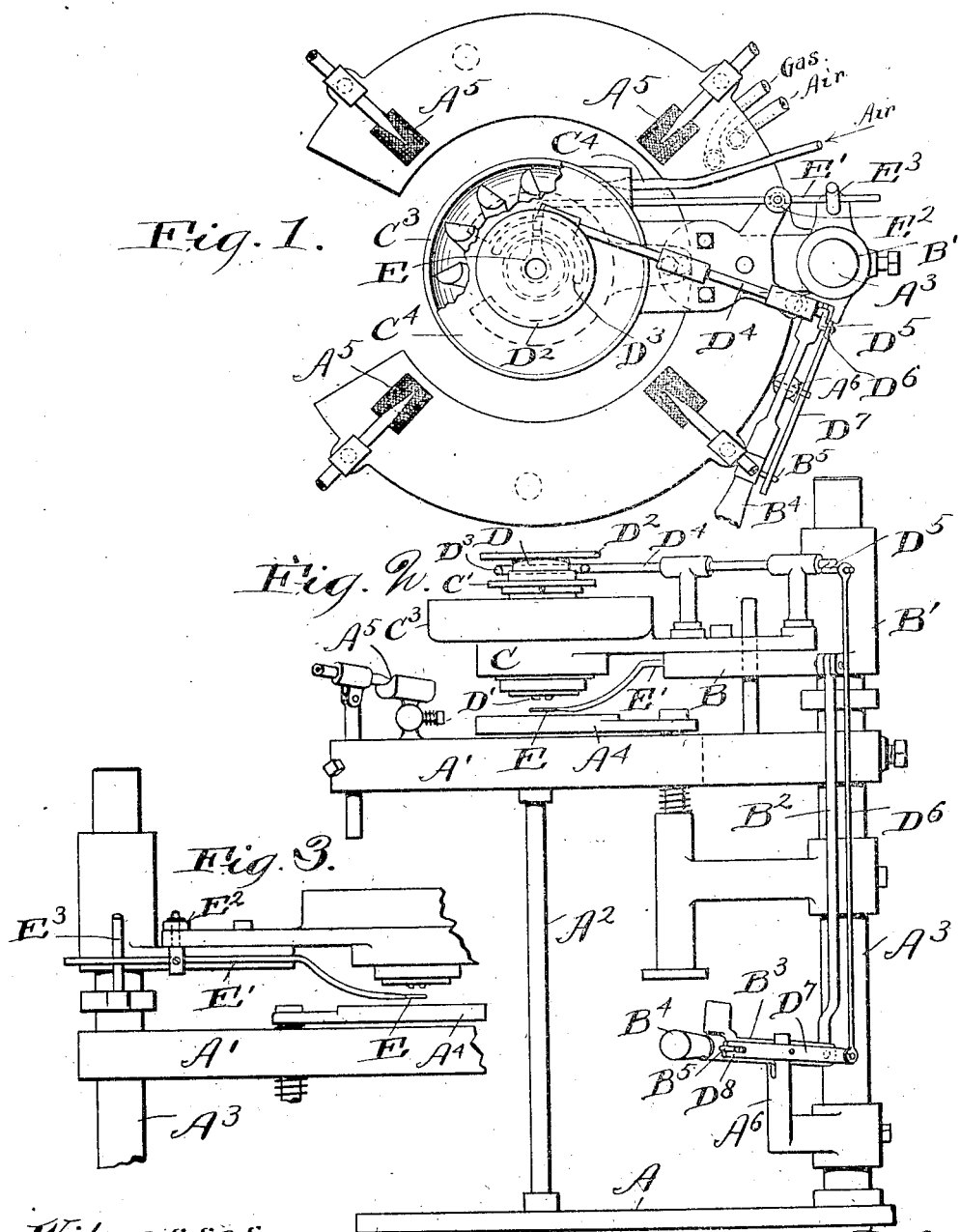

No. 882,190. PATENTED MAR. 17, 1908.
J. T. FAGAN.
MACHINE FOR HEATING GLASS TUBES.
APPLICATION FILED APR. 20, 1906.
2 SHEETS—SHEET 2.
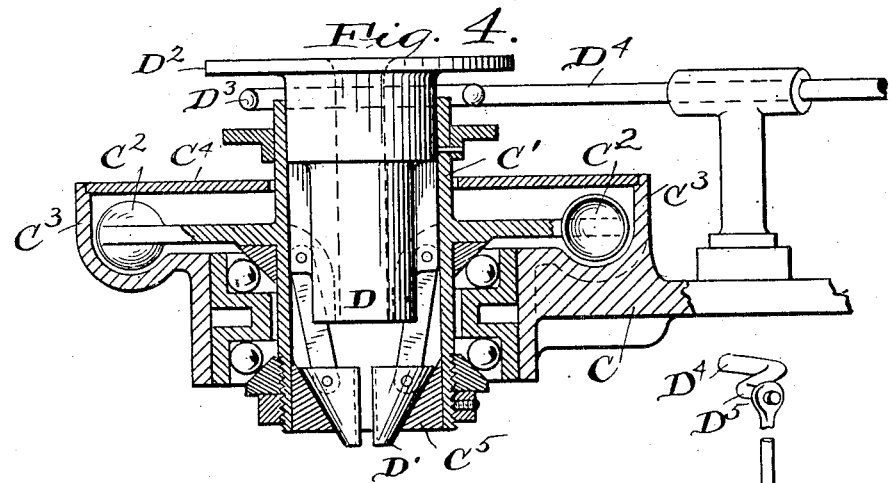
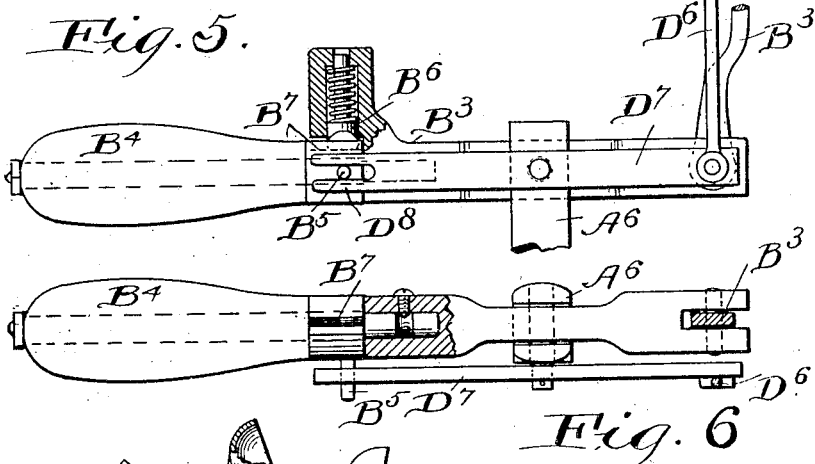
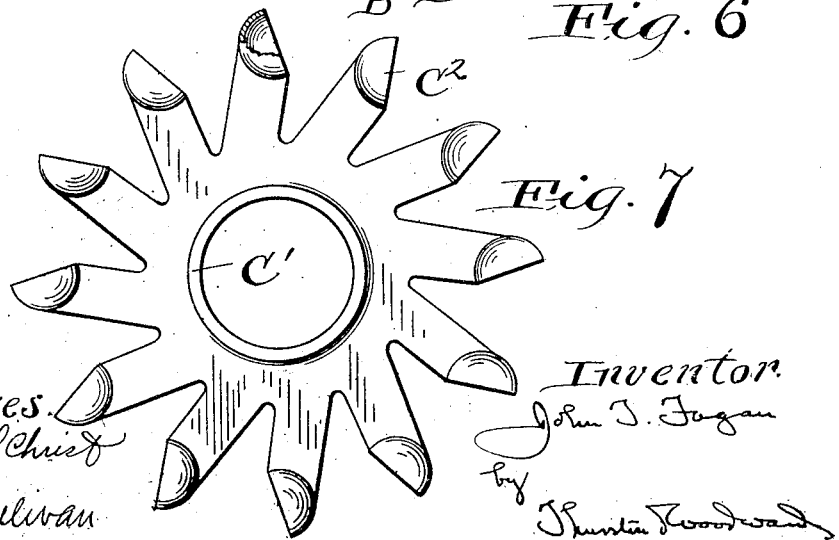

UNITED STATES PATENT OFFICE.

JOHN T. FAGAN, OF CLEVELAND, OHIO, ASSIGNOR TO THE NATIONAL ELECTRIC LAMP COMPANY, OF CLEVELAND, OHIO, A CORPORATION OF NEW JERSEY.

MACHINE FOR HEATING GLASS TUBES.

No. 882,190.

Specification of Letters Patent.

Patented March 17, 1908.

Application filed April 20, 1906. Serial No. 312,747.

*To all whom it may concern:*

Be it known that I, JOHN T. FAGAN, a citizen of the United States, residing at Cleveland, in the county of Cuyahoga and State of Ohio, have invented a certain new and useful Improvement in Machines for Heating Glass Tubes, of which the following is a full, clear, and exact description.

The object of the present invention is to provide an improved machine for holding glass tubes in heating flames where it is necessary that such tubes should receive the heat evenly about a certain zone. Such a machine is particularly useful in the heating of the ends of glass tubes used in the manufacture of incandescent lamps, in which art it is desirable to have means for heating the tube at a definite point and applying such heat in a uniform manner in order that the fusion may be substantially the same around the entire circumference of the tube. Heretofore, there have been employed for this purpose, certain hand-operated devices comprising supporting frames with standards carrying reciprocating brackets, upon which brackets clamps for holding the tubes were mounted. The clamps were of the ordinary type, comprising a pair of pivoted jaws held together by a spring, between which jaws the tubes were thrust by hand. The application of heat to the ends of the tubes, or to that portion which it was desired to fuse, was accomplished by means of a double flame burner held in the hand, which was manipulated by the operator around the tube as accurately as possible in order to secure an even fusion on all sides. The reciprocation of the bracket up and down for the purpose of bringing the zone of fusion to a given point for any reason, was accomplished through the medium of a lever arm pivoted to the frame and connected to the bracket by a suitable link. Through the medium of such mechanism, exhaust tubes have been heated and applied to bulbs for a number of years, the tube being heated at the lower end through the medium of the hand-manipulated burner as above described, and then lowered until in contact with the upper end of a bulb which would be held against a rest immediately underneath the reciprocating tube-holding clamp. Such a method of operation was exceedingly slow, and the application of heat to the tube was so uneven that I devised certain mechanical devices for securing the rotation of the tube between fixed fires and invented a chuck for holding the same, which could be fed from the top. I was thus enabled to use a hopper or other constant feeding apparatus whereby the operator could not only secure a more uniform and higher grade of work, but could multiply the output to a considerable extent.

The devices which I have hitherto employed have been in the nature of positively driven chucks, which, while exceedingly satisfactory with most grades of glass, have been found to be subject, under certain circumstances, to the defect of transmitting the shock of sudden starting and stopping to the chuck jaws so as to break the tube held thereby.

An object of the present invention is to provide a chuck mechanism adapted to hold the tube in the heating flame and to be rotated in an easy, elastic manner so as to be entirely free from shock of any sort. Furthermore, the particular device which I have produced, is one capable of being applied to the hand-operated machines now in use without any material alteration in their structure as they stand at present, thus making it possible to ship the attachment to the various plants in which such hand-operated apparatus is used and to allow the local machinist to effect the transformation without any considerable expense.

Referring to the accompanying drawings, Figure 1 is a plan view of a tubulating machine embodying my invention. Fig. 2 is a side elevation of the same. Fig. 3 is a detail showing the arrangement for throwing the gage plate beneath the chuck. Fig. 4 is a detail section showing the structure of my chuck. Fig. 5 is a side view partly in section of my controlling lever. Fig. 6 is a plan view of the same, also partly in section. Fig. 7 is a plan with a portion broken away, showing the structure of the driving wheel by which my chuck is rotated.

I have herewith illustrated a tubulating machine, which has the usual supporting frame, comprising a base, A, a table A' and supporting standards $A^2$ $A^3$. Mounted on one of the standards, $A^3$, is an adjustable rest $A^4$ against which the bulb is held during the heating of the tube, which is to be applied thereto. Mounted on the table, are the usual gas jets, A⁵, so located as to concentrate their flame about the tube at a point near the top of the bulb as it is held in the rest. Above the table, is a reciprocating bracket B projecting from a sleeve B' slidingly mounted upon a standard A³ and controlled through the medium of a connecting rod B² pivoted to the end of the hand lever B³ which is fulcrumed on a bracket A⁸ fixed to a standard of the frame. These parts of the mechanism are well known and in ordinary use in the old type of machine, but in such type a pair of spring-controlled clamping jaws are secured to the said upper reciprocating bracket B and the operator manipulates a hand burner by which she directs a flame upon a tube from all sides as nearly alike as possible. I have, however, abandoned the use of such clamping jaws and have mounted upon the reciprocating bracket a plate C which carries ball bearings for a hollow rotatable sleeve C' as shown in Fig. 4. The detail structure of these bearings is not material, as I may use any convenient form. It is merely desirable that a bearing be employed which will afford as little friction as possible. Projecting from the sides of the hollow sleeve are a series of arms having on their ends cups C² adapted to receive impulse from a current of compressed air or other fluid.

The supporting plate is so shaped as to form a bowl or inclosing box C³ in which the air cups or vanes may rotate. I provide for this bowl a suitable covering plate, C⁴, which is centrally perforated to allow the hollow sleeve to pass therethrough and rotate freely therein. At the side of the inclosing bowl, C³, I apply, more or less tangentially, a conducting pipe C⁴ for the admission of the compressed motive fluid. This pipe is usually a short nipple, which may be attached by a rubber tube to the compressed air supply of the factory, a stop-cock or other controlling valve being provided at a convenient point.

Into the lower end of the hollow rotatable sleeve I have fixed a hollow cone C⁵ designed to operate to close the chuck jaws D⁷ depending from a hollow spool D, loosely and freely reciprocative in the upper part of said sleeve C'. This spool, has at its upper end, a wide flange D² designed to permit the engagement therewith, on the under side, of a semi-circular yoke D³ on the end of a rock shaft D⁴ which latter is journaled in T brackets on the supporting plate. At the outer end of this rock shaft is a horizontally disposed crank D⁵ connected by a link D⁶ with a lever D⁷ which is fulcrumed upon the same pin which supports the hand lever B³ that controls the reciprocation of the sliding bracket B'. In place of the hand-operated lever of the ordinary type, I use one in which the handle B⁴ is rotatably mounted in the end of the lever and has projecting therefrom at one side, a pin B⁵ engaging a fork D⁸ at the end of the lever D⁷ controlling the aforementioned rock shaft D⁴.

A small spring-pressed detent B⁶ engaging with a notch B⁷ on the handle serves to hold it ordinarily in the position as shown in Fig. 2, but it is obvious that a twist of the handle in the proper direction would rotate the pin B⁵ projecting from the side thereof and consequently tilt the lever D⁷ with which the said pin engages, and transmit a rocking motion to the shaft D⁴ on which the semi-circular yoke D³ is fixed. Said yoke will then rise at the side and bear against the flange D² on the upper end of the spool D thereby lifting the latter so that the chuck jaws D' depending from the lower end thereof, will be drawn away from the hollow cone C⁵ which holds them together, thereby allowing them to swing apart and free any tube which might have been held thereby.

Referring to Figs. 1 and 3, it will be noted that on the side of the reciprocating bracket B' is pivoted the stem E' of a gage plate E in such manner as to be capable of sidewise oscillation. A coil spring E² suitably located, tends to throw this gage plate out from beneath the chuck, but an inclined rod E³ projecting from the side of the supporting standard A³ lies in the path of the outer end of the gage plate stem in such manner that upon reciprocation of the supporting bracket B' the stem will ride against the inclined projection E³ and be oscillated thereby so as to throw the gage plate beneath the chuck.

In the operation of the device, the air is turned on to the driving vanes C² and produces a constant rotation of the hollow sleeve C', having the internal cone at the lower end. The compressed air of course leaks out through the loose fittings of the various parts and in such manner that it is not found necessary to provide any especial vent therefor. When it is desired to pass a tube within the chuck either automatically or by hand, the operator presses down the hand lever which elevates the sliding bracket B' carrying the chuck. This causes the gage plate previously mentioned to swing beneath the chuck. The operator thereupon gives the handle B⁴ a slight turn, as before described, lifting the spool D up in such manner that the chuck jaws are disengaged from the internal cone and hang open so as to allow a tube to be dropped therebetween. On the tube being dropped into the chuck either automatically or by hand, it falls therethrough until it strikes the gage plate beneath, by which it is held to project a given distance so that the subsequent operations may be regulated in a uniform manner to produce a uniform product. The operator now gives the handle a backward twist to restore it to its former position, where the detent B⁶ will drop into groove B⁷, thus permitting the spool which carries the chuck jaws to drop until said jaws come in engagement with the internal cone D' and thus grasp the tube and hold it so as to transmit the rotative motion thereto. The sliding bracket B' is then lowered until the rapidly rotating tube is passed to the proper point in the heating flames, the heating zone being entirely within the selection of the operator. If now it is desired to apply the heated tube to a bulb, the latter may be held against the rest and the hand lever operated to lower the tube until it comes in contact with the bulb and fuses thereto. A twist of the handle will then readily elevate the spool which carries the chuck jaws and release the tube so that the bulb with its attached tube may be withdrawn and the process repeated.

From the above description it will be seen that the mechanism, which I have devised, is one by which it is possible not only to apply uniform heat to a tube by securing the rapid rotation of the latter, but such rotation is secured in a manner which precludes the possibility of any breakage arising from shock transmitted to the chuck through positive mechanical drives.

The arrangement which I have devised not only eliminates the possibility of shock being transmitted from the source of power through the gradual acceleration of the speed of rotation from zero to the working rate, but it absorbs the shock generated in the chuck itself when the spool which carries the chuck jaws is dropped into position to grasp the tube and take up the movement of rotation. Furthermore, it will be noted that it is possible by simply removing the spring-closed jaws and hand lever on machines now in use on hand-operated machines, to apply the supporting plate and its connected parts in place of the said jaws, and to substitute the new hand lever which I have described in place of that hitherto used, and thus produce an automatic machine with comparatively small expense to the user. This latter point is one of considerable importance in the business since the frames of the machines are more or less expensive, and small manufacturers can not always afford to entirely re-model their factories by installing mechanically operated machines *de novo*.

Having thus described my invention, I claim:

1. Mechanism adapted for holding glass tubes to a heating means comprising a reciprocatable rotatable chuck for holding said tubes, and means for transmitting rotative motion to said chuck through the medium of fluid under pressure.

2. Mechanism adapted for holding glass tubes to a heating means comprising a chuck, mechanical connections for reciprocating the chuck and means for applying fluid under pressure to rotate the chuck.

3. An attachment adapted for machines designed to heat glass tubes, comprising an inclosing cup, a chuck having vanes which project into the cup, said chuck being rotatably mounted, and means for leading fluid into said cup.

4. An attachment adapted for machines designed to heat glass tubes comprising an inclosing cup, a chuck sleeve rotatably mounted and provided with jaw closing means and having vanes projecting into said cup, chuck jaws in said sleeve so supported as to be adapted to be thrown in or out of operative condition.

5. Mechanism adapted for holding glass tubes to a heating means comprising a reciprocatable chuck, means for reciprocating the chuck, a hand hold for said reciprocating means and means operable by said hand hold for opening said chuck.

6. Mechanism adapted for holding glass tubes to a heating means comprising a reciprocatable chuck, means for reciprocating the chuck, a hand hold for said reciprocating means capable of partial rotation, and means so connected with said hand hold that partial rotation of the latter will operate to open the chuck.

In testimony whereof, I hereunto affix my signature in the presence of two witnesses.

JOHN T. FAGAN.

Witnesses:
   A. H. STRICKER,
   R. G. McKAY.